United States Patent
Ishii et al.

(10) Patent No.: US 9,501,210 B2
(45) Date of Patent: Nov. 22, 2016

(54) INFORMATION PROCESSING APPARATUS

(71) Applicant: Panasonic Corporation, Kadoma-shi, Osaka (JP)

(72) Inventors: Takumi Ishii, Osaka (JP); Yusaku Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 14/313,454

(22) Filed: Jun. 24, 2014

(65) Prior Publication Data
US 2015/0007073 A1 Jan. 1, 2015

(30) Foreign Application Priority Data

Jun. 27, 2013 (JP) ................................. 2013-134596
Jun. 20, 2014 (JP) ................................. 2014-127358

(51) Int. Cl.
*G06F 13/00* (2006.01)
*G06F 15/00* (2006.01)
*G06F 3/0484* (2013.01)
*G06F 3/0488* (2013.01)
*G06F 3/0481* (2013.01)

(52) U.S. Cl.
CPC ......... *G06F 3/04842* (2013.01); *G06F 3/0481* (2013.01); *G06F 3/0488* (2013.01); *G06F 2203/04806* (2013.01)

(58) Field of Classification Search
CPC .................................................. G06F 3/04883
USPC ................. 715/771, 863, 810, 880, 763–765
See application file for complete search history.

(56) References Cited

U.S. PATENT DOCUMENTS

| 6,184,859 B1 * | 2/2001 | Kojima | G06F 3/0481 345/629 |
| 8,907,899 B2 * | 12/2014 | Park | G06F 3/04817 345/173 |
| 2007/0247435 A1 | 10/2007 | Benko et al. | |

(Continued)

FOREIGN PATENT DOCUMENTS

| JP | 4-359311 | 12/1992 |
| JP | 9-6984 | 1/1997 |

(Continued)

OTHER PUBLICATIONS

Office Action issued in corresponding Japanese Patent Application No. 2014-127358 on May 10, 2016.
Form PO-892 issued in U.S. Appl. No. 14/343,483 on Apr. 22, 2016.

*Primary Examiner* — Kevin Nguyen
(74) *Attorney, Agent, or Firm* — Hamre, Schumann, Mueller & Larson, P.C.

(57) ABSTRACT

An information processing apparatus includes a display device configured to display a first image, a coordinate input device configured to input coordinates on the first image, and a processor configured to perform processing based on input to the coordinate input device. The processor specifies a part of a region on the first image as a specific region, based on coordinates of two points that are input to the coordinate input device, generates a second image that is obtained by enlarging the specific region at a predetermined magnification, and causes the display device to superimpose and display the second image on the first image with the second image occupying a part of the first image.

8 Claims, 15 Drawing Sheets

(56) References Cited

U.S. PATENT DOCUMENTS

| | | | |
|---|---|---|---|
| 2009/0295830 A1* | 12/2009 | Muraveynyk | G06F 3/0481 345/629 |
| 2012/0131488 A1* | 5/2012 | Karlsson | G06F 3/04883 715/771 |
| 2013/0201533 A1* | 8/2013 | Takemoto | G06K 15/027 358/406 |
| 2013/0293672 A1* | 11/2013 | Suzuki | H04N 5/23238 348/36 |
| 2014/0062917 A1* | 3/2014 | Seo | G06F 3/04883 345/173 |
| 2014/0298153 A1 | 10/2014 | Tsujimoto et al. | |
| 2015/0033193 A1* | 1/2015 | Beaurepaire | G06F 3/04845 715/863 |

FOREIGN PATENT DOCUMENTS

| | | |
|---|---|---|
| JP | 11-244245 A | 9/1999 |
| JP | 2005-251104 A | 9/2005 |
| JP | 2012-48465 A | 3/2012 |
| JP | 2012-123066 | 6/2012 |
| JP | 2012-175486 A | 9/2012 |
| WO | WO 2012/108132 | 8/2012 |

* cited by examiner

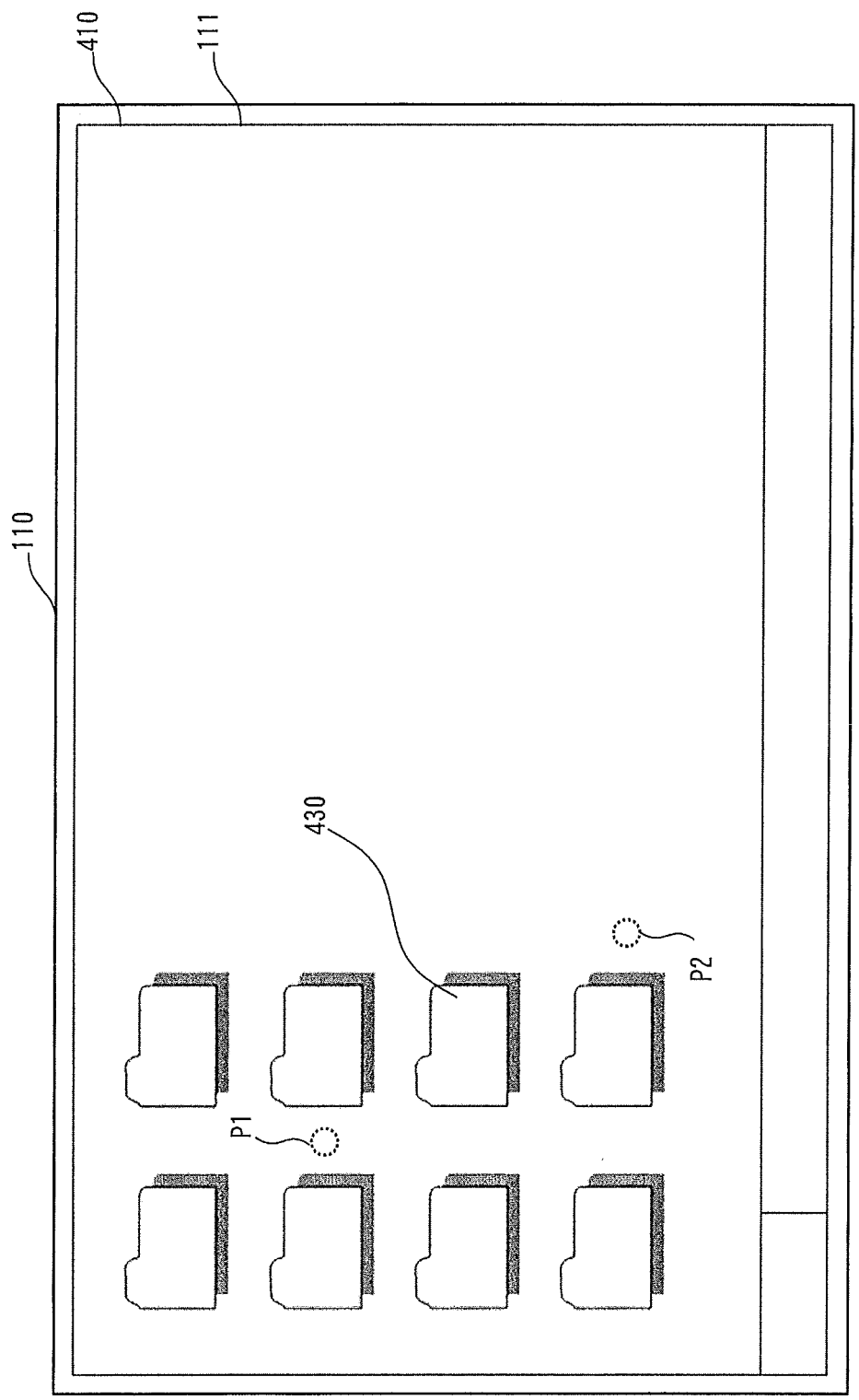

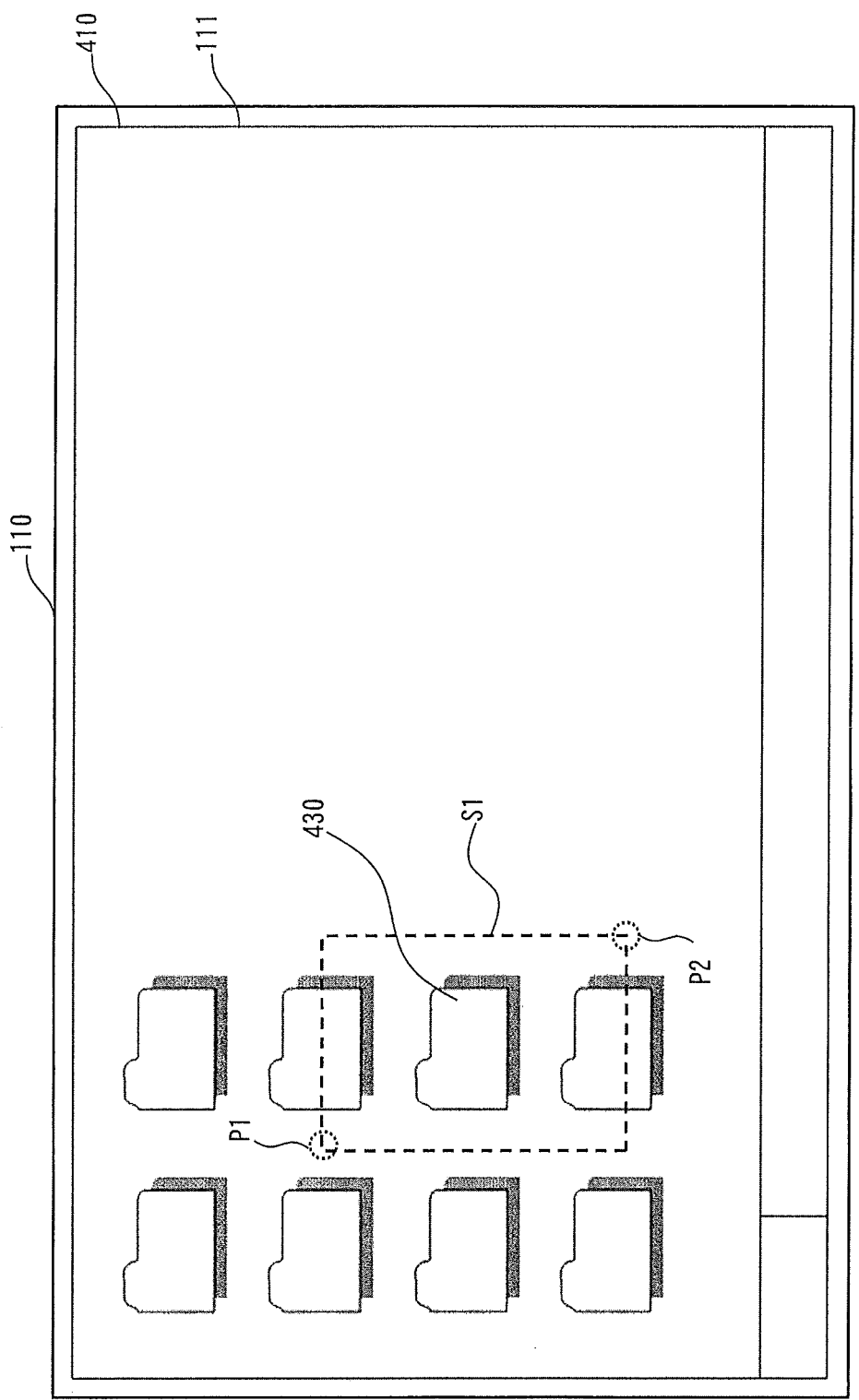

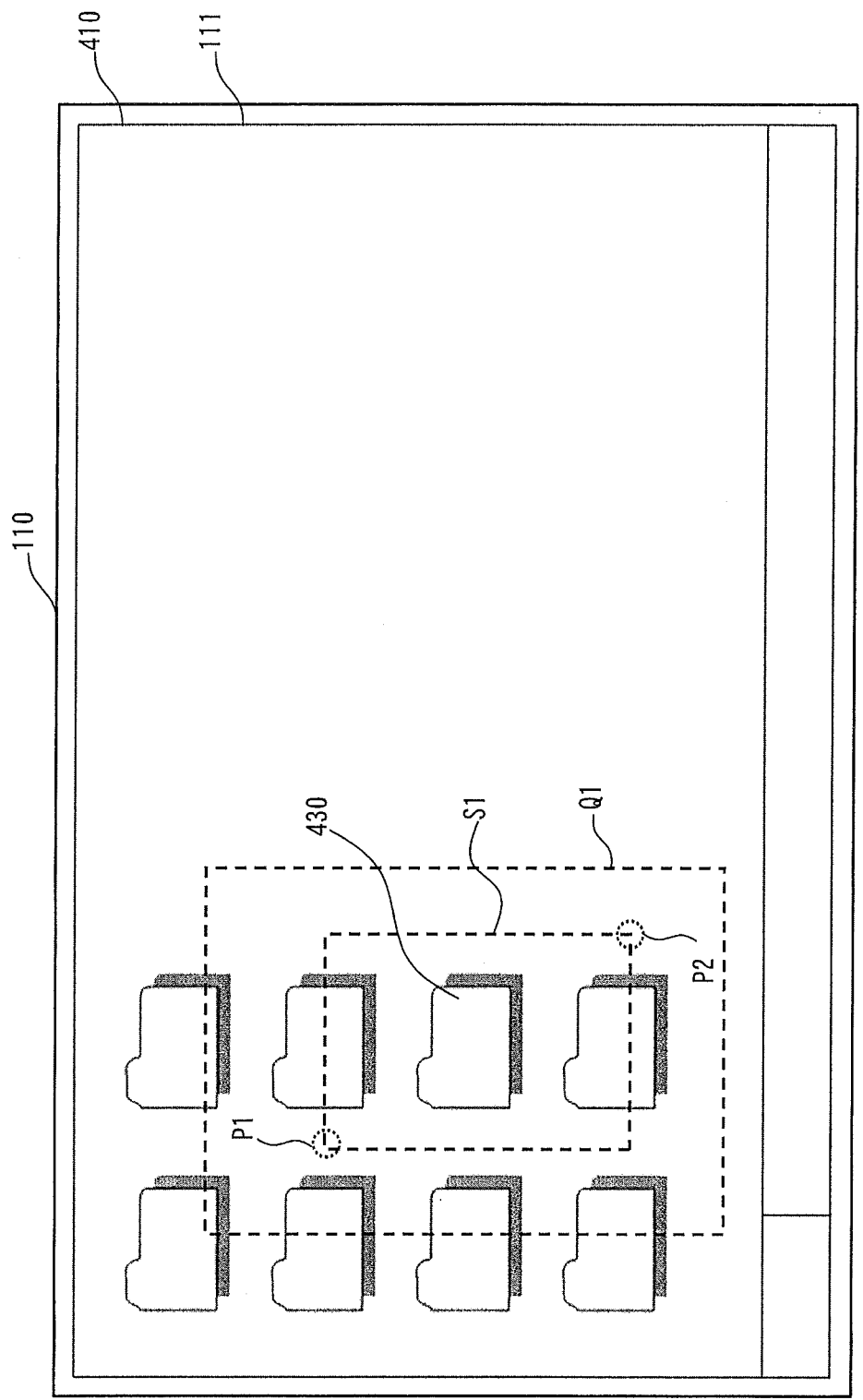

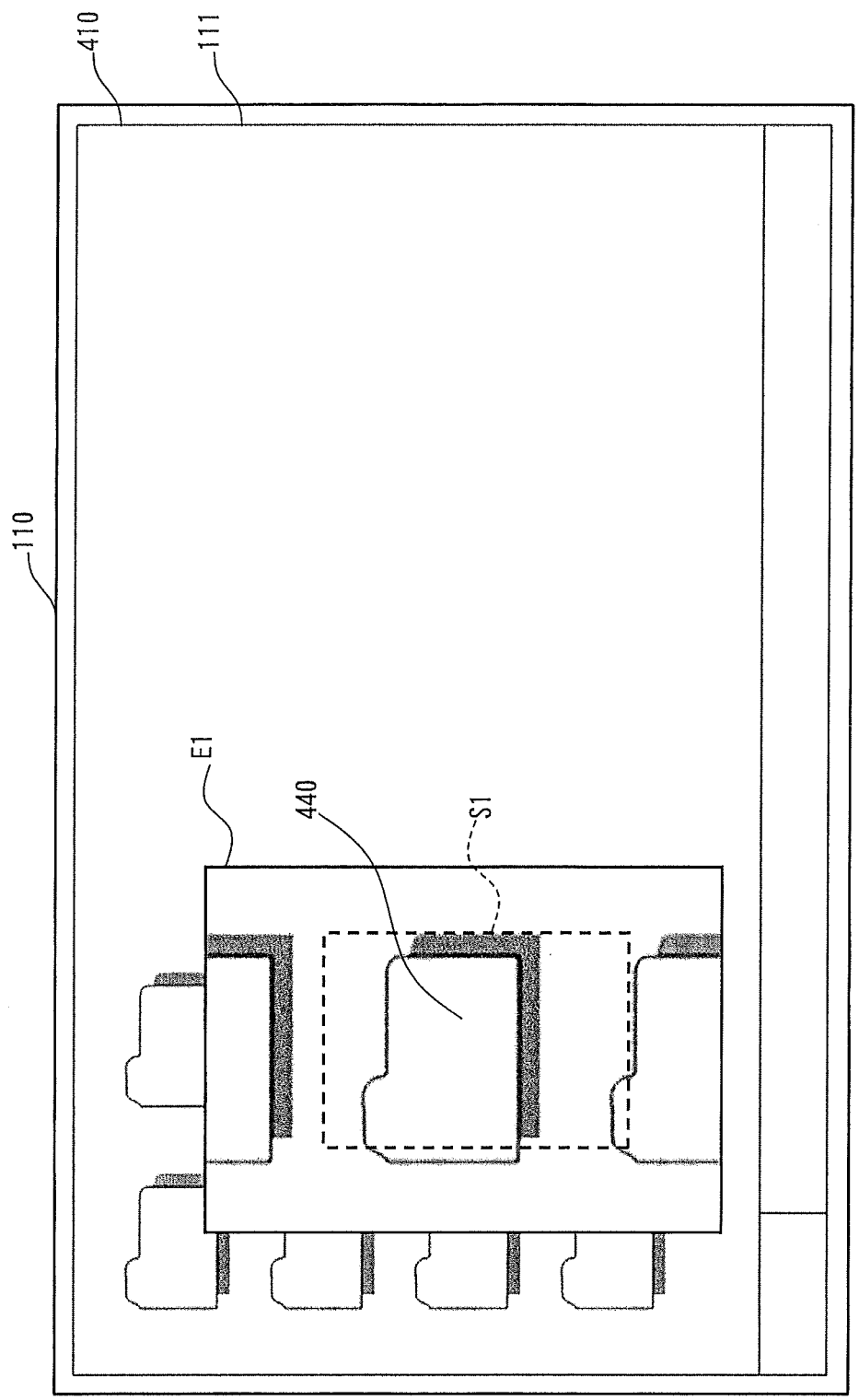

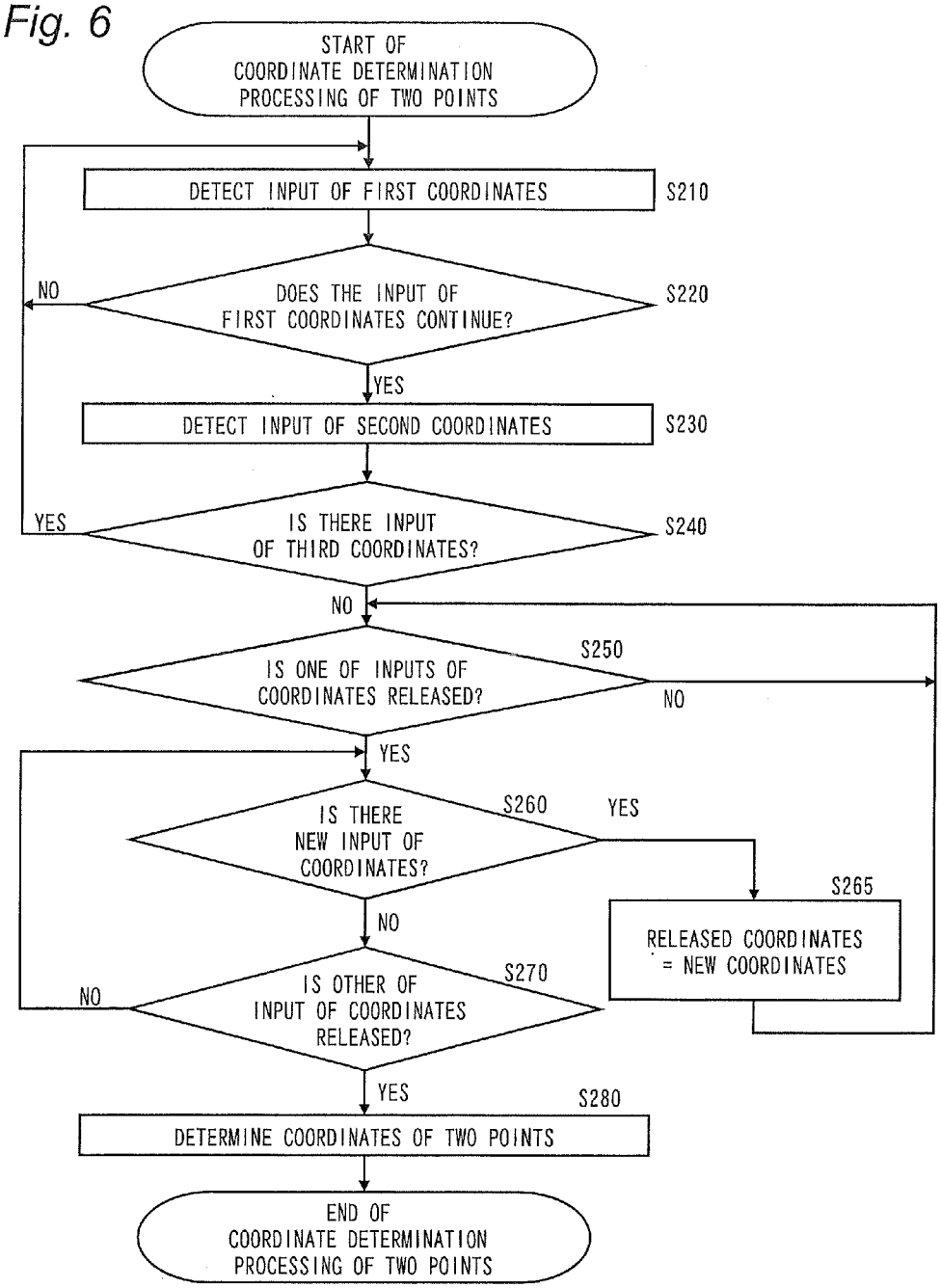

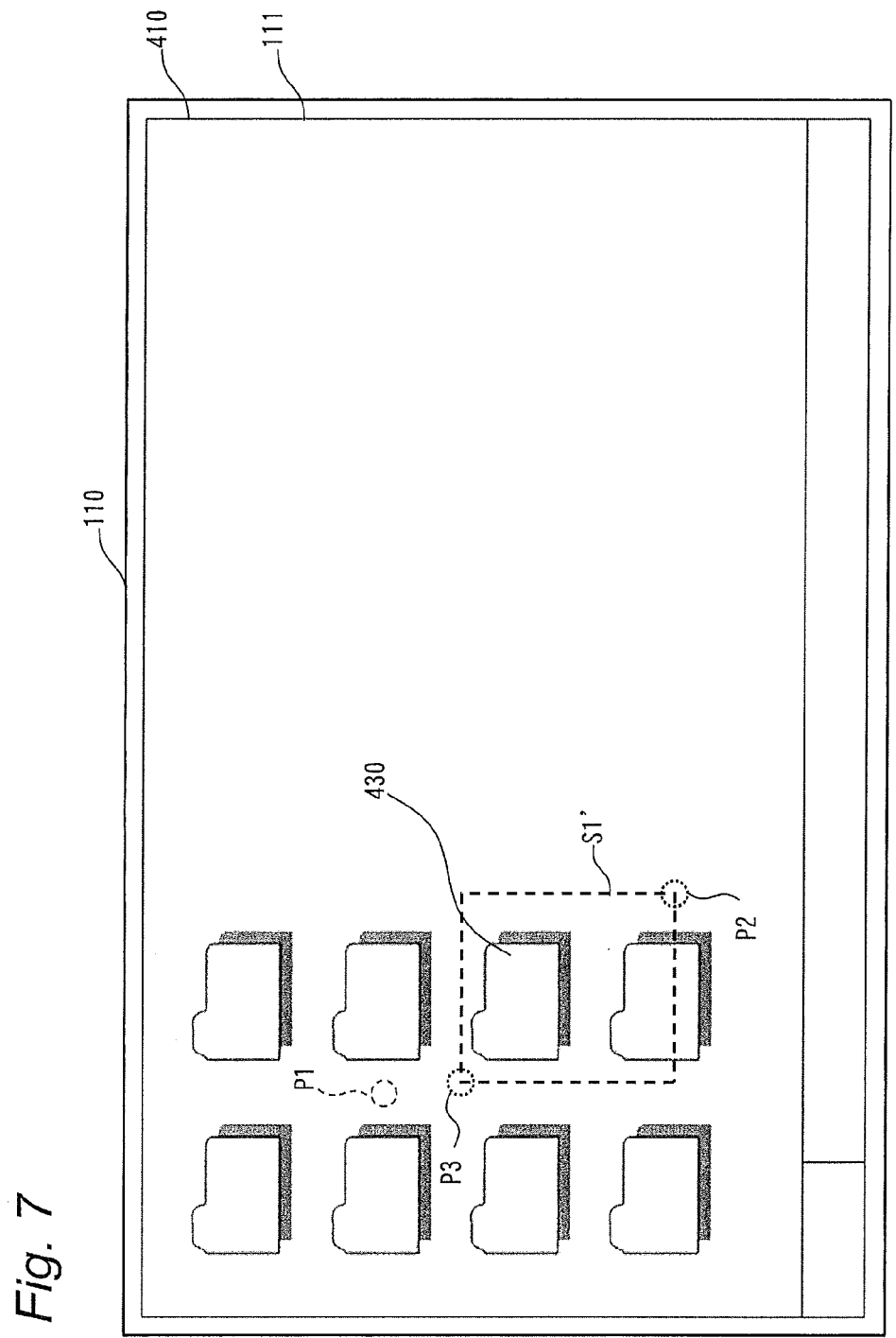

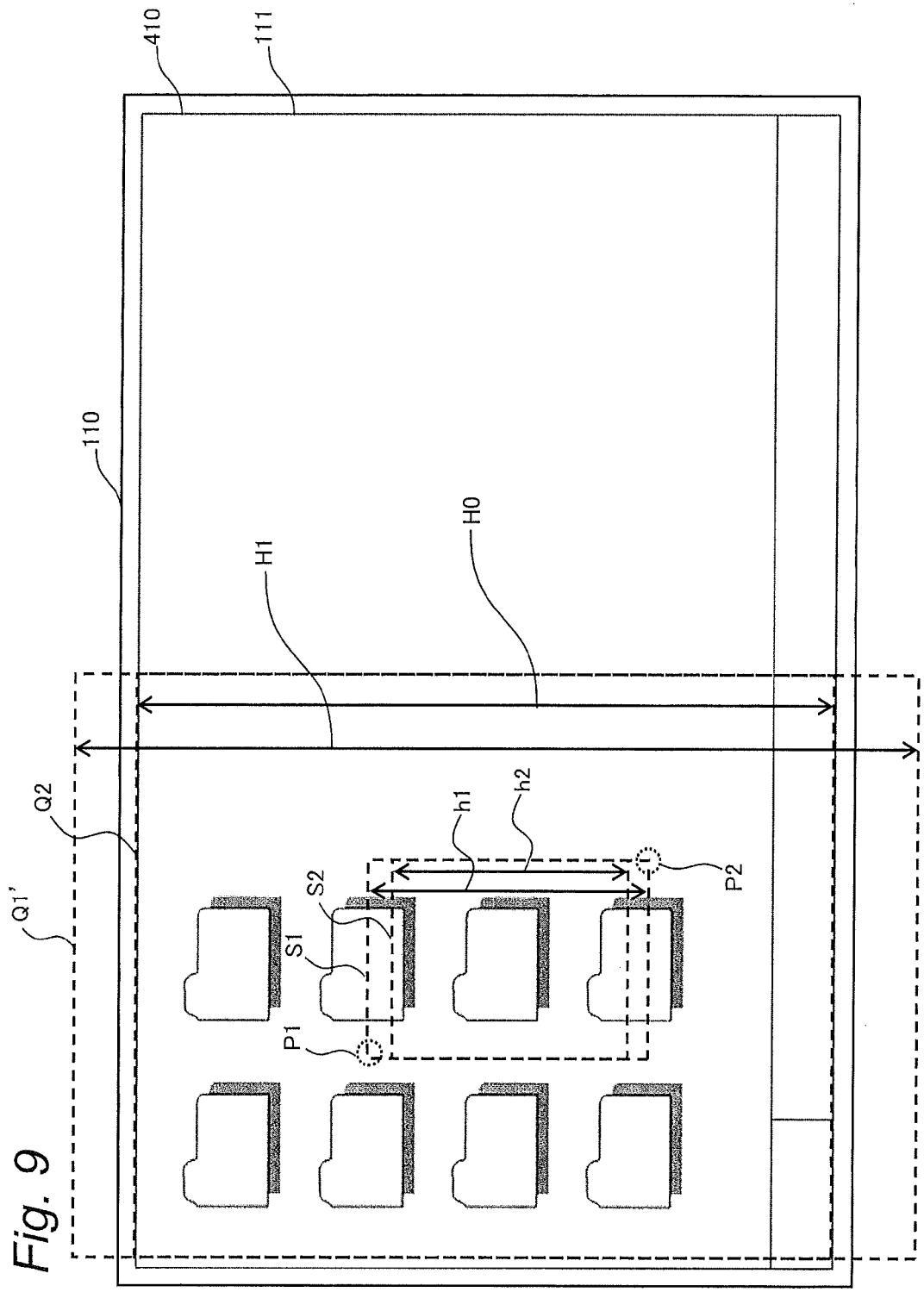

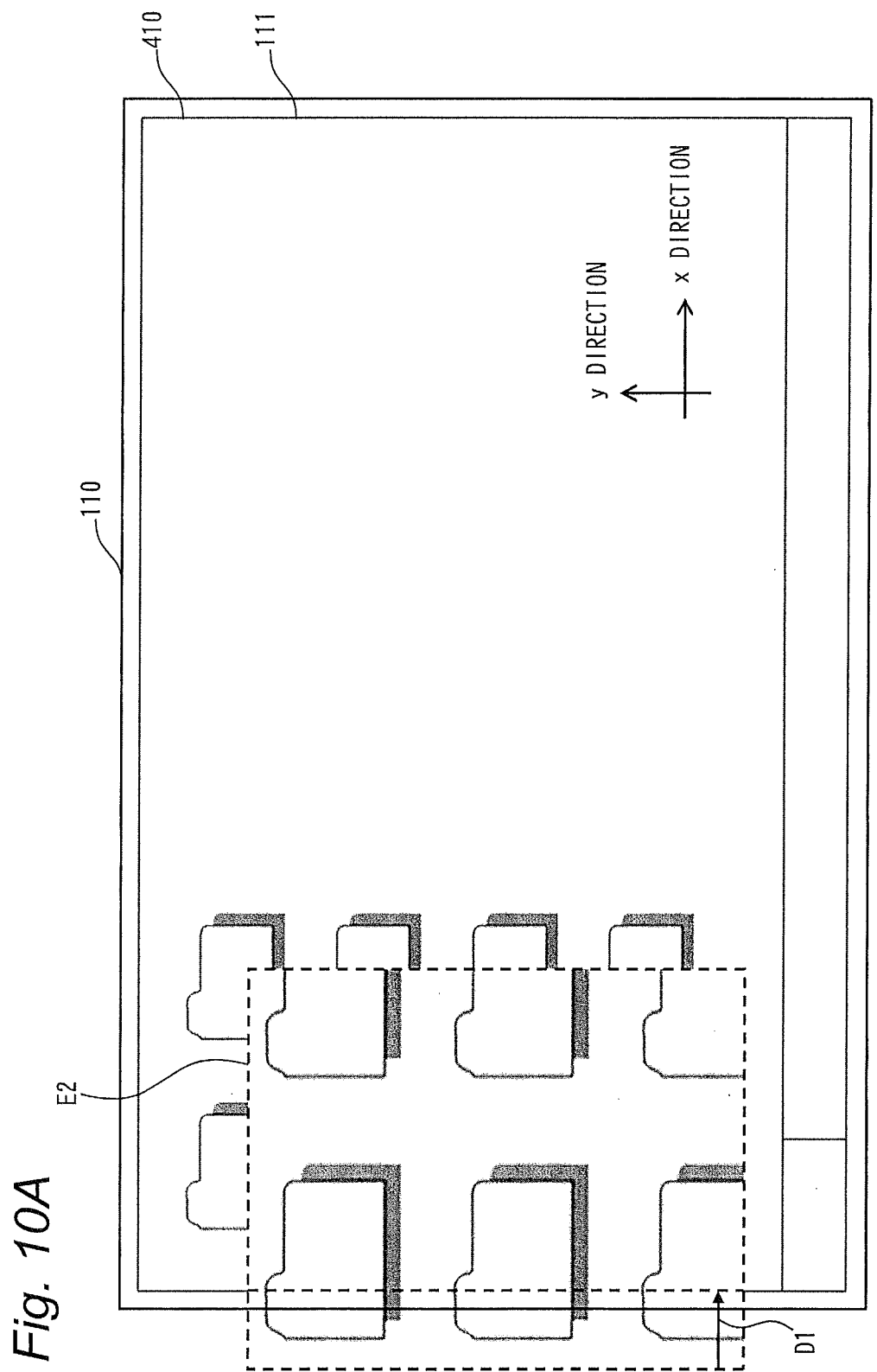

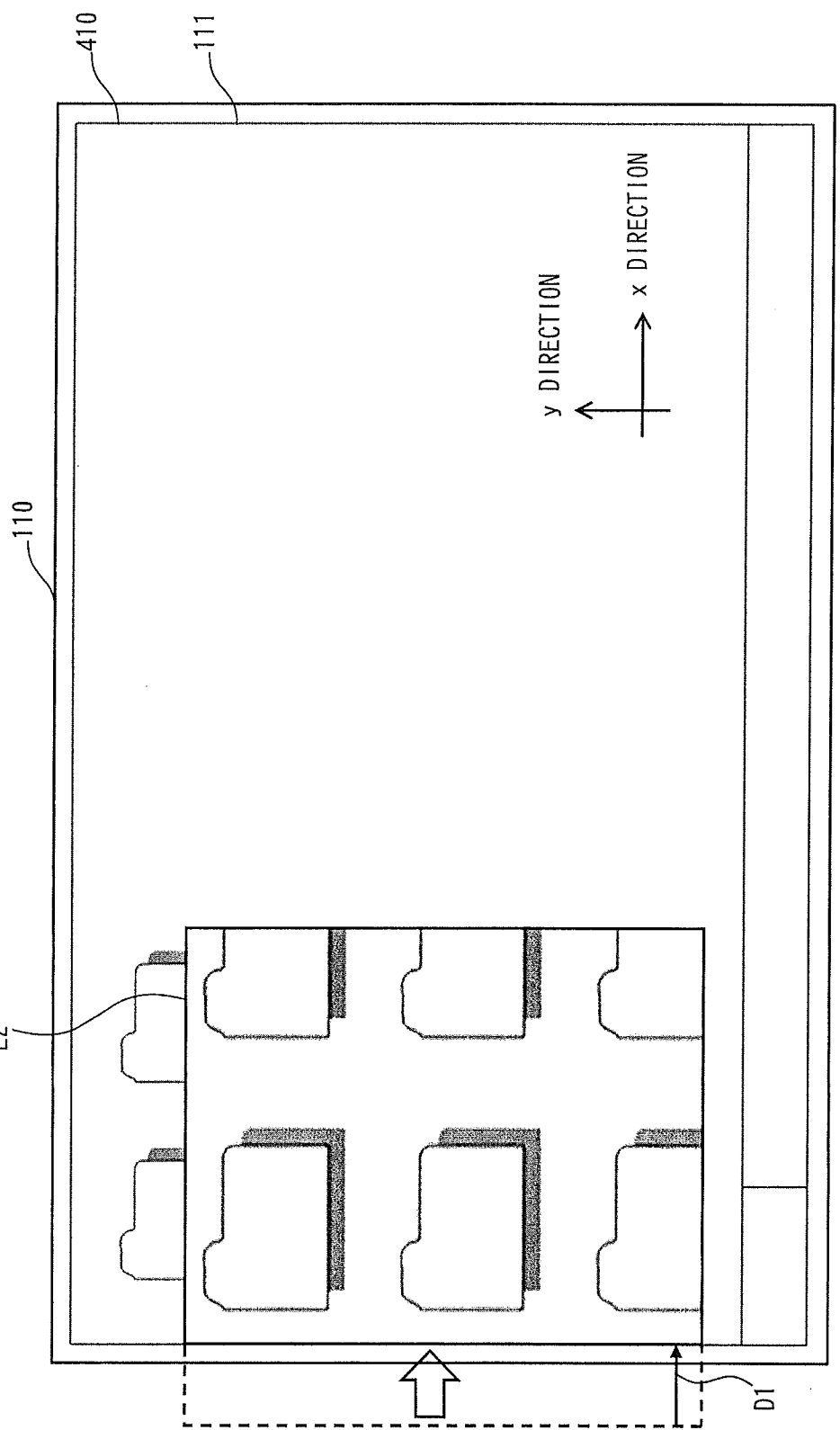

INFORMATION PROCESSING APPARATUS

BACKGROUND

1. Technical Field

The present disclosure relates to an information processing apparatus that can be operated by designating coordinates on a screen.

2. Related Art

In recent years, an increase in the resolution of display units has been advancing in information processing apparatuses such as notebook personal computers and desktop personal computers. However, as the increase in the resolution of display units advances, objects such as displayed characters and icons become smaller, and visibility with respect to the objects decreases. JP 4-359311 A discloses an information processing apparatus that is capable of addressing this problem. This information processing apparatus is capable of enlarging a display region when a user designates a position on image information displayed by its displaying means.

SUMMARY

The present disclosure provides an information processing apparatus that enables a user to designate a region to be enlarged in a display image of a display device by a simple operation.

An information processing apparatus according to the present disclosure includes a display device configured to display a first image, a coordinate input device configured to input coordinates on the first image, and a processor configured to perform processing based on input to the coordinate input device. The processor specifies a part of a region on the first image as a specific region, based on coordinates of two points that are input to the coordinate input device, generates a second image that is obtained by enlarging the specific region at a predetermined magnification, and causes the display device to superimpose and display the second image on the first image with the second image occupying a part of the first image.

According to the information processing apparatus in the present disclosure, a user is able to designate a region to be enlarged in a display image of a display device by a simple operation.

BRIEF DESCRIPTION OF DRAWINGS

FIG. 5A shows a screen shot of the first image illustrating an example of coordinate determination processing of two points.

FIG. 5B is a view for describing a rectangular region in an example of calculation processing of a specific region.

FIG. 5C is a view for describing an enlargement assumption region in an example of the calculation processing of the specific region.

FIG. 5D shows an example of a display by superimposition display processing of an enlarged image.

FIG. 6 is a flowchart for describing the coordinate determination processing of two points in the first embodiment.

FIG. 7 shows a screen shot of the first image showing another example of the coordinate determination processing of two points.

FIG. 9 shows a screen shot of the first image showing another, example of the calculation processing of the specific region in the first embodiment.

FIG. 10A is a view for describing an example of the processing of shifting the enlarged image.

FIG. 10B shows an example of the display by the processing of shifting the enlarged image.

DETAILED DESCRIPTION

Figure 1:
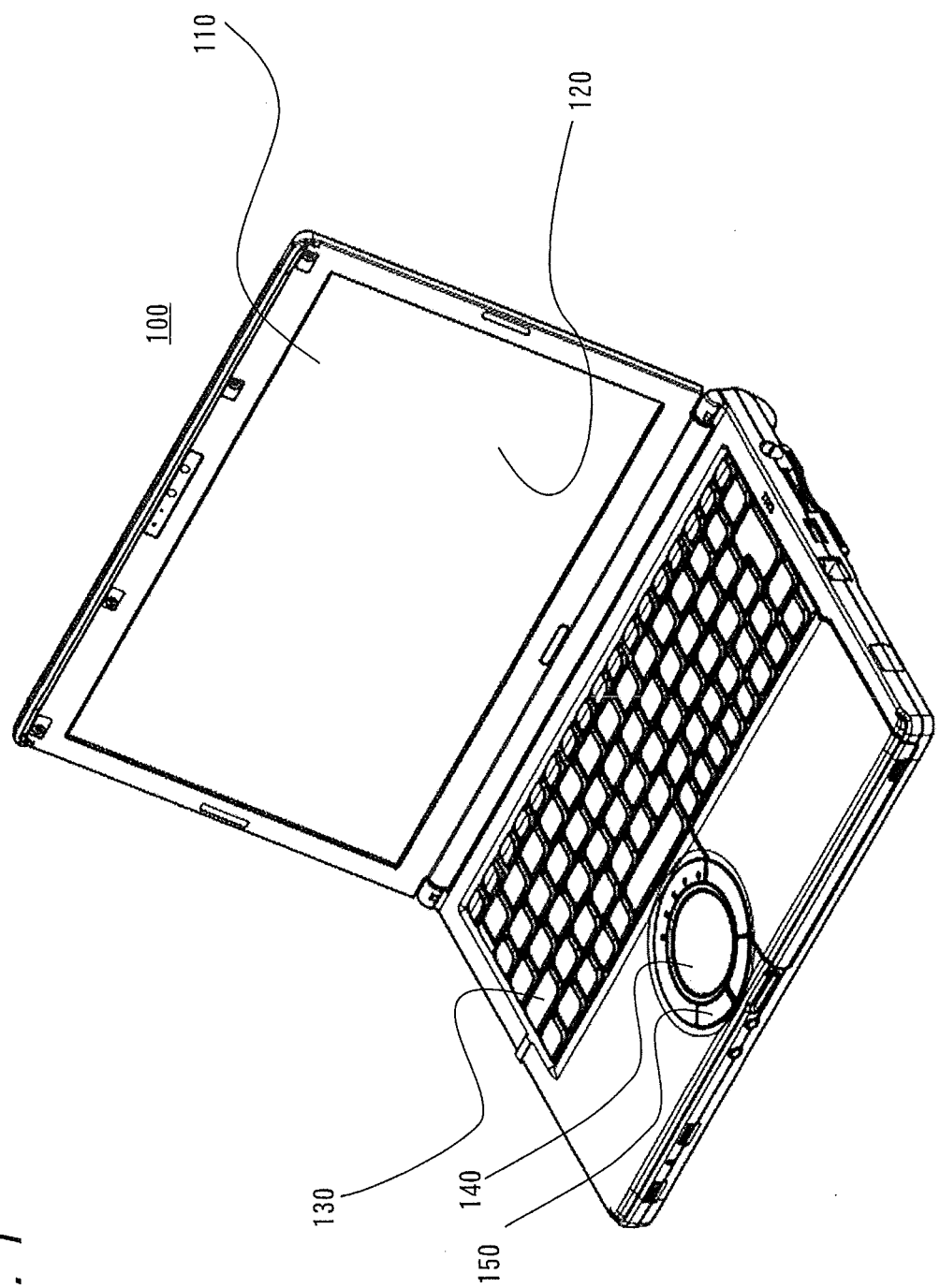
FIG. 1 is a view showing an external appearance of an information processing apparatus in a first embodiment.

Hereinafter, an embodiment is described in detail while referring to the drawings as appropriate. However, detailed descriptions are sometimes omitted when they are not required. For example, detailed descriptions of already well-known matters and repeated descriptions of substantially identical configurations are sometimes omitted. This has been done in order to avoid the following description from becoming unnecessarily redundant, and to facilitate understanding for persons skilled in the art.

It should be noted that the inventor(s) has provided the appended drawings and the following description in order for persons skilled in the art to sufficiently understand the present disclosure, not with the intention of thereby restricting the subject described in the claims.

(First Embodiment)

Hereinafter, a first embodiment is described with reference to FIGS. 1-10B.

1-1. Configuration

FIG. 1 is a view showing the external appearance of an information processing apparatus in the first embodiment.

An information processing apparatus 100 performs predetermined information processing based on an installed OS (operating system). The present embodiment describes an example in which the present disclosure has been applied to a notebook personal computer (PC) as an example of the information processing apparatus. The information processing apparatus to which the present disclosure is applied is not limited to a notebook personal computer. The present disclosure can also be applied to the information processing apparatus such as a laptop PC, a tablet PC, a smartphone, and the like.

The information processing apparatus 100 includes a display device 110, a touch panel 120, a keyboard 130, a touchpad 140, and buttons 150.

The display device 110 displays still images or moving images. A liquid crystal display is used as the display device 110 in the present embodiment, but different kinds of the display device can be used (e.g. organic electroluminescent display).

The touch panel 120 is a sensor that is integrally incorporated in the display device 110. A user of the information processing apparatus 100 is able to operate the information processing apparatus 100 by way of the touch panel 120 by touching the display surface of the display device 110.

The keyboard 130 receives key input from the user of the information processing apparatus 100.

The touchpad 140 receives input through touching operation from the user of the information processing apparatus 100. The user is able to operate the information processing apparatus 100 by touching the touchpad 140.

The buttons 150 are input devices with which a pressing operation is possible. The information processing apparatus 100 of the present embodiment includes a plurality of the buttons 150. The user of the information processing apparatus 100 is able to operate the information processing apparatus 100 by operating the buttons 150. Operations that can be executed by means of the buttons 150 include, for example, left-click and right-click operations, a double-click operation, and the like.

The touch panel 120, the keyboard 130, and the touchpad 140 are able to function as coordinate input devices for inputting coordinates of the display screen of the display device 110. In the present embodiment, it will be described that the case where the touch panel 120 functions as a coordinate input unit.

In the present disclosure, moving a cursor continuously by moving a finger across the touch panel 120 or the touchpad 140 for example, or by operating a direction key of the keyboard 130, is referred to as a drag operation.

Figure 2:
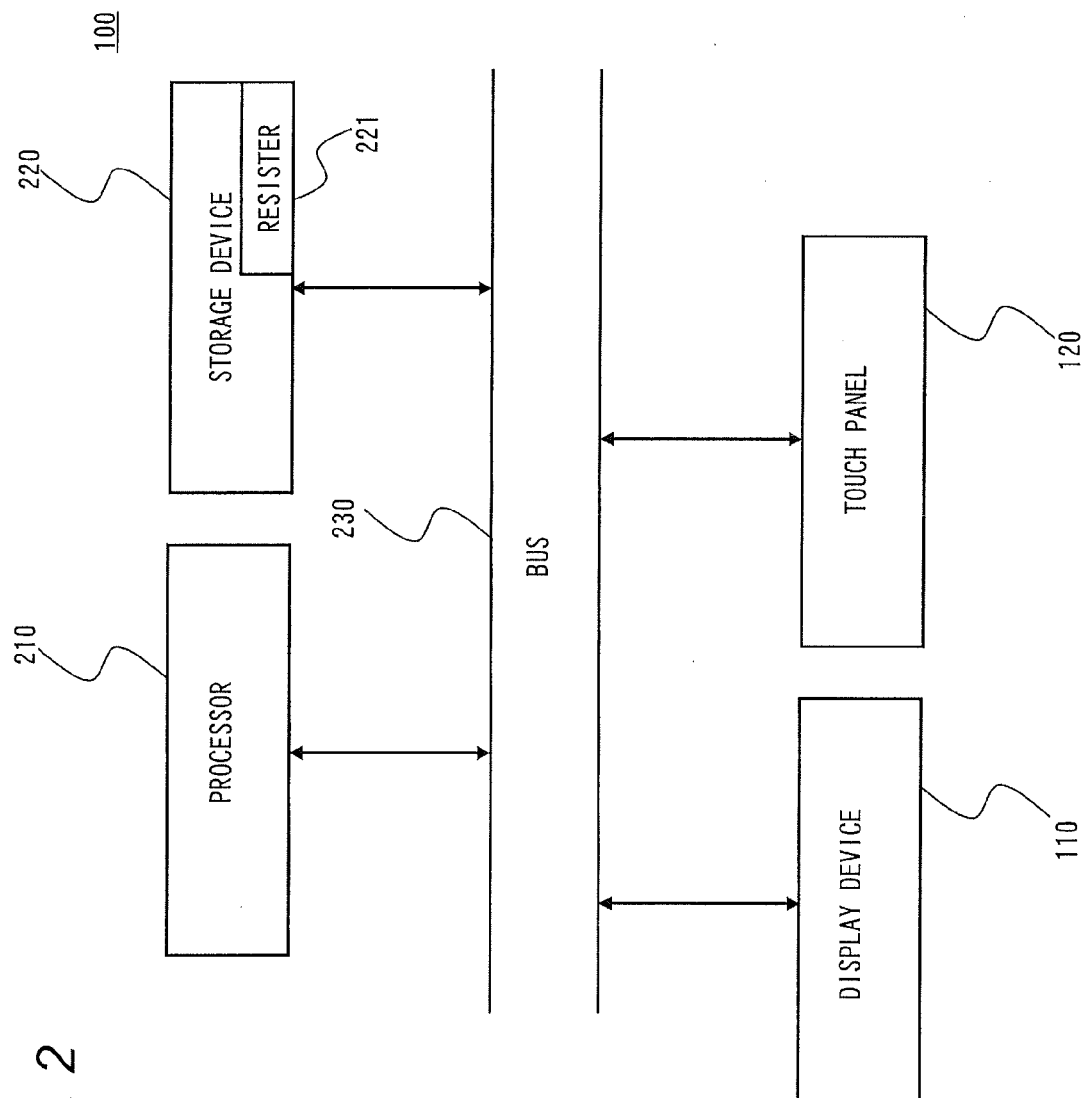
FIG. 2 is a block diagram showing the configuration of the information processing apparatus in the first embodiment.

FIG. 2 is a block diagram showing the configuration of the information processing apparatus in the first embodiment The information processing apparatus 100 further includes a processor 210, a storage device 220, and a bus 230.

The processor 210 executes programs stored in the storage device 220. The processor 210 controls the constituent elements configuring the information processing apparatus 100 by executing the programs. For example, by executing a predetermined program, the processor 210 causes the display device 110 to display image information stored in the storage device 220.

The storage device 220 temporarily or permanently stores data required for the information processing apparatus 100 to perform information processing. The storage device 220, for example, stores programs and numerical values to which the programs refer. As the storage device 220, a non-volatile memory or a HDD (hard disk drive) for example is used. An OS is stored in the storage device 220. The OS provides to the user a system which allows the program (software) to handle the constituent elements provided in the information processing apparatus 100. Furthermore, a program for enlargement display processing described hereinafter is stored in the storage device 220.

The storage device 220 has a register 221 that holds a flag showing a sense state of an input to the touch panel 120. The flag of the register 221 is set to H (a high level), when the touch panel 120 senses a touch by the user or the like. On the other hand, when the touch panel 120 does not sense a touch by the user or the like, the flag of the register 221 is set to L (a low level). The register 221 holds a plurality of flags, to sense a plurality of coordinates that are input to the touch panel 120. The register 221 may not be included in the storage device 220, and may be provided inside the touch panel 120.

The bus 230 is a communication path for control signals and data transmitted and received by the constituent elements configuring the information processing apparatus 100. Control signals and data are transmitted and received among the constituent elements of the information processing apparatus 100 via the bus 230. In the present embodiment, the display device 110, the touch panel 120, the processor 210, and the storage device 220 are connected to the bus 230.

Via the bus 230, the processor 210 transmits and receives various signals with the constituent elements configuring the information processing apparatus 100, and thereby controlling the constituent elements. For example, the touch panel 120 sends coordinate information to the processor 210 via the bus 230. The coordinate information is information relating to the coordinates of a position that the user has touched on the touch panel 120. The processor 210 executes a program using received coordinate information to generate various signals and image data. Generated signals are transmitted to the storage device 220 via the bus 230, and are stored as data in the storage device 220. Further, generated image data is transmitted to the display device 110 via the bus 230. The display device 110 displays an image represented by the image data. It should be noted that, although not shown, signals corresponding to information input by the user in the keyboard 130, the touchpad 140, or the buttons 150 are also transmitted to the processor 210 via the bus 230.

1-2. Operation

An operation of the information processing apparatus 100 configured as described above will be described below.

Figure 3:
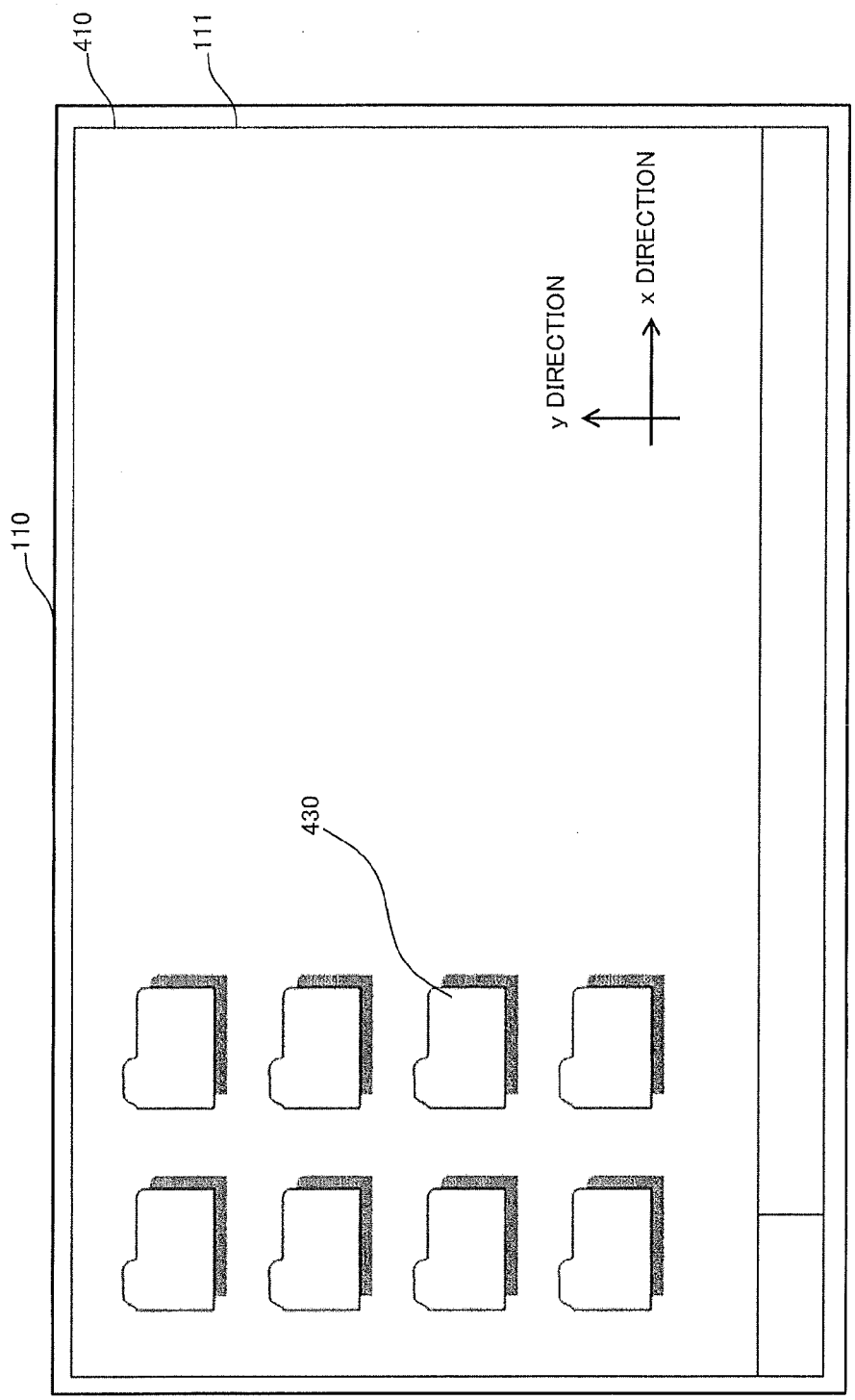
FIG. 3 shows a screen shot of a first image in the first embodiment.

The processor 210 causes the display device to display a first image. FIG. 3 shows a screen shot of the first image. A first image 410 is displayed by functions of the OS and the like. As examples of the first image 410, there are pointed out a desktop screen, a screen of a web browser, and a screen of paint software. Although the first image 410 is displayed in a whole of a display region 111 of the display device 110 in the present embodiment, the first image 410 may be displayed in only a part of the display region 111 of the display device 110. In the present embodiment, a size of the first image 410 is defined by a width and a height. A width direction of the first image 410 and the display region 111 of the display device 110 is set as an x direction, and a height direction of the first image 410 and the display region 111 of the display device 110 is set as a y direction. In the present embodiment, the first image 410 includes an icon 430.

1-2-1. Enlargement Display Processing

The information processing apparatus 100 according to the present embodiment can perform enlargement display processing. The enlargement display processing is processing of displaying an enlarged image which is obtained by enlarging a part of the region of the first image (the first image 410 shown in FIG. 3, for example), by superimposing the enlarged image on the first image, according to a user operation to the touch panel 120. The enlargement display processing will be described below.

Figure 4:
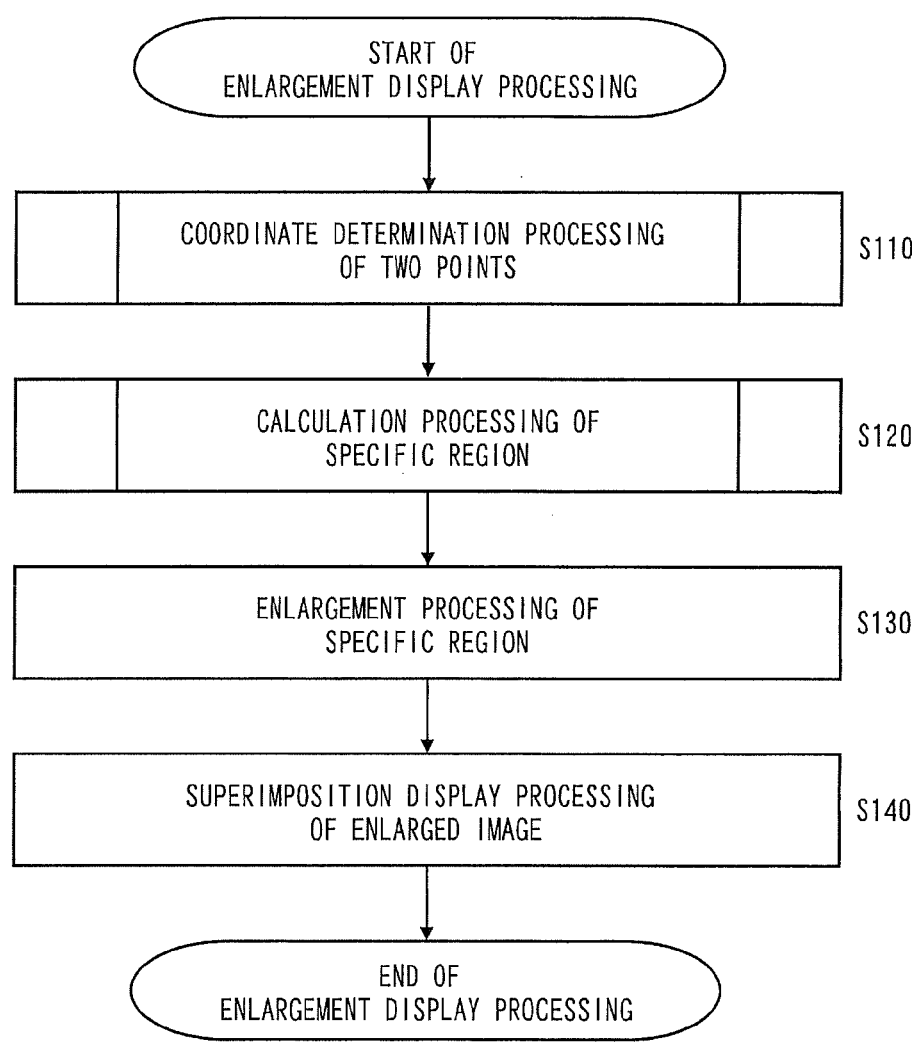
FIG. 4 shows a flowchart for describing enlargement display processing in the first embodiment.

FIG. 4 shows a flowchart for describing the enlargement display processing. FIGS. 5A to 5D show an example of a screen shot of the first image in a series of processing of the enlargement display processing.

Each processing in the flowchart of FIG. 4 is realized by the processor 210 executing a program stored in the storage device 220. In the following, a description will be made by taking an example that, before the enlargement display processing is started, the first image 410 as shown in FIG. 3 is displayed in the display device 110.

The enlargement display processing may be started by an explicit execution of a predetermined program by the user, or may be started by a background processing function of the OS.

First, the processor 210 performs coordinate determination processing of two points (step S110). The coordinate determination processing of two points is processing of determining the coordinates of two points on the first image 410 according to the input to the touch panel 120, in order to receive from the user, designation of a region which becomes an enlargement display target.

FIG. 5A shows a screen shot of the first image illustrating an example of the coordinate determination processing of two points. In order to cause the region including the icon 430 to be displayed by enlargement on the first image 410, for example, the user of the information processing apparatus 100 touches two points (coordinates of a point P1 and coordinates of a point P2) that sandwich the icon 430. Then, the processor 210 determines the coordinates of designated two points P1 and P2 based on input by such user's touch operation.

Next, the processor 210 performs calculation processing of a specific region (step S120). The calculation processing of a specific region is processing of calculating the specific region based on the coordinates of the two points determined by the coordinate determination processing of two points in step S110. The specific region is a part of the first image that becomes an enlargement display target in the enlargement display processing.

FIGS. 5B and 5C are views for describing an example of the calculation processing of a specific region based on the coordinates of the two points P1 and P2 shown in FIG. 5A. After the coordinates of the two points P1 and P2 are touched as shown in FIG. 5A, the processor 210 calculates a rectangular region S1 shown in FIG. 5B based on the coordinates of the two points P1 and P2. The rectangular region S1 is a region of a rectangular that is defined by using the coordinates of the two points P1 and P2 as end points of a diagonal line. The processor 210 decides, by using an enlargement assumption region Q1 as shown in FIG. 5C, whether an enlarged size of the rectangular region S1 is a size that can be within the display region 111. The enlargement assumption region Q1 is a virtual region for confirming a size of an enlarged image that is generated by later enlargement processing of a specific region (step S130). In the example shown in FIG. 5C, the enlargement assumption region Q1 that is obtained by enlarging the rectangular region S1 at a predetermined magnification is within the display region 111 of the display device 110. Therefore, the processor 210 specifies the rectangular region S1 as a specific region. When the enlargement assumption region Q1 cannot be within the display region 111 of the display device 110, the processor 210 specifies a specific region inside the rectangular region S1, as described later.

Next, the processor 210 performs the enlargement processing of a specific region (step S130). The enlargement processing of a specific region is processing of generating image information (a second image) of an enlarged image, by enlarging the image of the specific region specified in the calculation processing of a specific region in step S120.

Lastly, the processor 210 performs superimposition display processing of an enlarged image (step S140). The superimposition display processing of an enlarged image is processing of superimposing and displaying an enlarged image on the first image, based on the image information generated in the enlargement processing of a specific region in step S130.

FIG. 5D shows an example of a display by the superimposition display processing of an enlarged image, following the calculation processing of a specific region (step S120). The processor 210 causes an enlarged image E1 obtained by enlarging the rectangular region S1 shown in FIG. 5C to be superimposed and displayed on the first image 410 so that the enlarged image E1 occupies a part of the first image 410, as shown in FIG. 5D. The enlarged image E1 includes an icon 440 obtained by enlarging the icon 430 sandwiched by the user between the coordinates of the two points P1 and P2 in FIG. 5A.

In this way, in the enlargement display processing according to the present embodiment, the user can designate a part of the region that is desired to be enlarged in the first image, by a simple operation of inputting the coordinates of two points. The information processing apparatus 100 superimposes and displays the image of the enlarged designated region on the first image so that the enlarged image is within the display region ill of the display device 110. The pieces of processing in steps S110 to S140 will be described in detail below.

1-2-1-1. Coordinate Determination Processing of Two Points

The coordinate determination processing of two points (step S110) in FIG. 4 will be described. In the coordinate determination processing of two points, the processor 210 determines the coordinates of two points that are included in the first image 410 based on the input of a plurality of coordinates that the user of the information processing apparatus 100 inputs. The operation for inputting the coordinates of two points is an operation that the user, for example, touches two points on the touch panel 120 with fingers, and thereafter, releases the fingers off the touch panel 120. With this operation, the processor 210 determines the coordinates of the two points based on the input of coordinates of the two points. The user can simply perform the above operation, by substantially simultaneously touching the two points on the touch panel 120, for example, using the thumb and the middle finger.

When the user has performed an operation other than the example as described above, the processor 210 determines coordinates of two points by performing exceptional processing. Such an exceptional operation corresponds to an operation by the user to input coordinates of a third point, or an operation by the user to release the touched finger off in the middle of the operation to input other coordinates, for example. Hereinafter, a processing method by which the processor 210 determines coordinates of two points will be described in detail.

FIG. 6 is a flowchart for describing the coordinate determination processing of two points. The processor 210 starts the coordinate determination processing of two points in step S110 in FIG. 4.

First, the processor 210 detects an input of coordinates of a first point (first coordinates) on the touch panel 120 (step S210). Specifically, when the user first touches on the touch panel 120, the touch panel 120 then senses the touched coordinates. Subsequently, the touch panel 120 generates coordinate information that shows the sensed coordinates in a format in which the processor 210 can process the coordinate information. The touch panel 120 transmits the generated coordinate information to the processor 210 via the bus 230. The processor 210 receives the coordinate information of the input coordinates of the first point from the touch panel 120. The processor 210 records the received first coordinate information into the storage device 220.

Next, the processor 210 decides whether the input (input operation) of the first coordinates continues (step S220). A state that the input of the coordinates continues is a state that the user keeps touching the touch panel 120, for example.

A method of deciding a state that the input of the coordinates continues will be described below. Upon sensing a touch by the user or the like, the touch panel 120 generates coordinate information indicating the sensed coordinates, and also sets the flag of the register 221 to H. On the other hand, upon sensing a release of a touch on the touch panel 120, the touch panel 120 sets the flag of the register 221 to L. The processor 210 monitors the flag of the register 221, and decides that the input of coordinates by the user or the like continues, during a period in which the flag of the register 221 is kept being set to H. On the other hand, when the flag of the register 221 is changed over from H to L, the processor 210 decides that the input of coordinates by the user or the like does not continue and that the input is released.

When the input of the coordinates of the first point does not continue (NO in step S220), the processor 210 returns to the processing in step S210. On the other hand, when the input of the coordinates of the first point continues (YES in step S220), the processor 210 detects an input of coordinates of a second point (second coordinates) onto the touch panel 120 (step S230). Because a method of detecting the coordinates of the second point is identical with the method of detecting the input of the coordinates of the first point in step S210, a detailed description of the method of detecting the coordinates of the second point will be omitted. The processor 210 records the input second coordinate information into the storage device 220.

Next to the processing in step S230, the processor 210 decides whether there is an input of coordinates of a third point. The processor 210 detects the input of coordinates of the third point, by deciding whether coordinates different from the coordinates of the two points input in the processing in steps S210 and S230 are input. When there is a third input of coordinates (YES in step S240), the processor 210 returns to the processing in step S210. That is, the processor 210 returns to a state that no coordinates are input.

By the above operation, even in the case where the information processing apparatus 100 executes an application for executing specific processing by simultaneously receiving inputs of coordinates of three or more points on the touch panel 120, it is possible to avoid a competition between the processing described in the present disclosure and the specific processing of the application.

When there is no input of coordinates of the third point (NO in step S240), the processor 210 decides whether the input of the coordinates of either the first point or the second point is released or not (step S250). Specifically, the processor 210 decides a release of the input of coordinates, by monitoring the flag of the register 221, in a similar manner to that in step S220.

When either the input of the coordinates of the first point or the input of the coordinates of the second point is released (YES in step S250), the processor 210 decides whether there is a new input of coordinates (new coordinates) or not (step S260). The processor 210 detects the new input of coordinates, by deciding whether there is an input of coordinates different from the other input of coordinates that is not released in step S250 out of the two points that are detected in steps S210 and S230.

Detection of a new input of coordinates is executed until the other input of coordinates in step S250 is released (NO in step S260). The processor 210 detects a release of the other input of coordinates in step S250, by monitoring the flag of the register 221, in a similar manner to that of step S220 (step S270).

When the other input of coordinates in step S250 is released (YES in step S270), the processor 210 determines the coordinates of the two inputs that are held in the storage device 220, as the coordinates of the two points (step S280), and ends the coordinate determination processing of two points. The processor 210 performs subsequent calculation processing of a specific region, enlargement processing of the specific region, and superimposition display processing of an enlarged image using the determined coordinates of the two points.

On the other hand, in the processing in step S260, upon detecting a new input of coordinates (YES in step S260), the processor 210 replaces the coordinates released in step S250 with the new coordinates (step S265). Specifically, the processor 210 rewrites the released coordinate information out of the first and second coordinate information that are held in the storage device 220, with coordinate information of the new input of coordinates, and performs the processing in step S250 again.

FIG. 7 shows an example that, after the user touches the coordinates of the points P1 and P2, the user cancels the touch of the coordinates of P1, and touches the coordinates of the point P3. It is assumed that until the user touches the coordinates of the point P3, a value of the first coordinate information is the value of the coordinates of the point P1, and a value of the second coordinate information is the value of the coordinates of the point P2. After the user touches the coordinates of the point P3, the processor 210 rewrites the value of the first coordinate information that is held in the storage device 220, from the value of the coordinates of the point P1 to the value of the coordinates of the point P3 (step S265). Next, the processor 210 decides whether the inputs (touches) of the coordinates of the points P3 and P2 are released (steps S250 to S270). After the user releases the inputs (touches) of both coordinates of the points P3 and P2, the processor 210 determines the coordinates of the points P3 and P2 as the coordinates of the two points (step S280). As a result, the user can change the region to be designated as an enlargement display target, from the rectangular region S1 shown in FIG. 5B to a rectangular region S1' shown in FIG. 7.

In this way, by the processing in step S265, when the user made an error in selecting a position to be touched on the touch panel 120 in the input of coordinates of the first point or the second point, the user can release only the wrong input of coordinates. At this time, by touching again a desired position, the user can correct the designated position to continue the processing.

In the present embodiment, coordinates of two points that are determined by the coordinate determination processing of two points are the coordinates at the time of the input of coordinates, that is, the coordinates of points touched by fingers of the user at an input timing. However, so long as the coordinates that are relevant to the input of coordinates are the coordinates of two points to be determined, these coordinates are acceptable. That is, coordinates that are touched at different timings of the fingers of the user, or coordinates of a point with a predetermined distance from an actually touched point, may be also determined as the coordinates of two points.

After ending the coordinate determination processing of two points, the processor 210 proceeds to the process of the calculation processing of a specific region (step S120) in FIG. 4.

1-2-1-2. Calculation Processing of Specific Region

The calculation processing of a specific region (step 120) in FIG. 4 will be described. In the calculation processing of a specific region, the processor 210 calculates a rectangular region defined by the coordinates of the two points on the first image determined in step S110. The processor 210 specifies a specific region that becomes an enlargement display target, from the calculated rectangular region. Hereinafter, a processing method for the processor 210 to calculate a specific region will be described.

Figure 8:
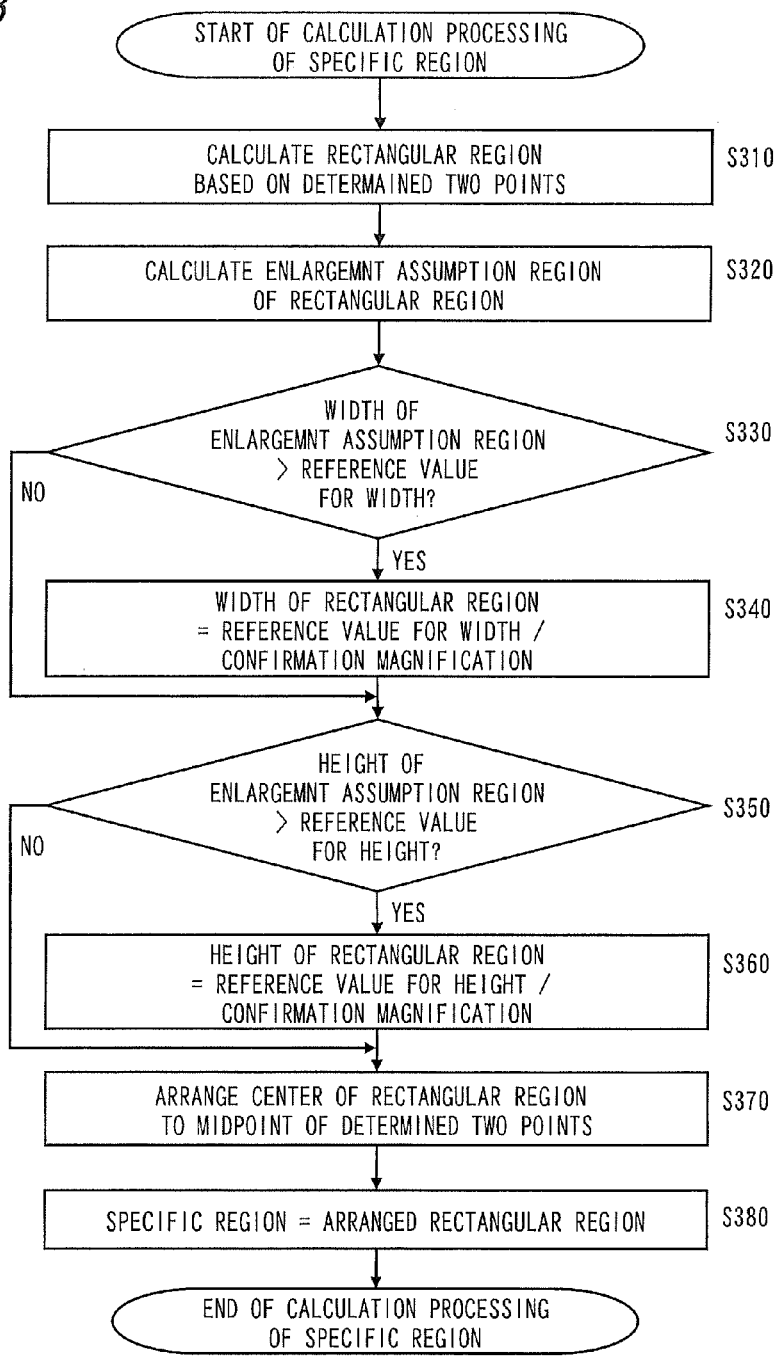
FIG. 8 is a flowchart for describing the calculation processing of the specific region in the first embodiment.

FIG. 8 is a flowchart for describing calculation processing of a specific region.

The processor 210 calculates a rectangular region that has, as a diagonal line, a straight line connecting the two points determined in step S110 with each other (step S310). In the processing in step S310, the processor 210 calculates a size of the rectangular region. A position of the rectangular region is not yet specified in the processing in step S310.

As shown in FIG. 5A, it is assumed here that, in the first image 410, the coordinates of P1 and the coordinates of P2 are determined as the coordinates of the two points. The processor 210 calculates, in step S310, the rectangular region S1 having, as a diagonal line, a straight line connecting the coordinates of the two points P1 and P2 with each other as shown in FIG. 5B. A height direction and a width direction of the rectangular region S1 are identical with a height direction and a width direction of the display region 111 of the display device 110.

Next, in step S320, the processor 210 calculates the enlargement assumption region Q1 which is obtained by enlarging the rectangular region S1 at a predetermined magnification (hereafter, referred to as "confirmation magnification") (see FIG. 5C). The enlargement assumption region Q1 is a virtual region for confirming a size of the enlarged image generated by the enlargement processing of a specific region (step S130), and the confirmation magnification is a predetermined magnification for calculating the enlargement assumption region.

Next, the processor 210 performs a comparison decision of comparing between a width of the enlargement assumption region Q1 and a reference value for width (step S330). This comparison is performed in a pixel unit, for example. The reference value for width is set to a value of the width of the display region 111 of the display device 110, in the present embodiment. When a width of the enlargement assumption region Q1 is larger than the reference value for width (YES in step S330), the processor 210 calculates again a rectangular region S2 so that the enlargement assumption region Q1 has a width of a value obtained by dividing the reference value for width by the confirmation magnification (step S340). On the other hand, when a width of the enlargement assumption region Q1 is equal to or smaller than the reference value for width (NO in step S330), the processor 210 performs the processing in step S350, without changing the rectangular region S1.

Next, the processor 210 performs a comparison decision of comparing between a height of the enlargement assumption region Q1 and a reference value for height (step S350). This comparison is performed in a pixel unit, for example. The reference value for height is set to a value of the height of the display region 111 of the display device 110, in the present embodiment. When a height of the enlargement assumption region Q1 is larger than the reference value for height (YES in step S350), the processor 210 calculates again the rectangular region S2 so that the enlargement assumption region Q1 has a height of a value obtained by dividing the reference value for height by the confirmation magnification (step S360). On the other hand, when a height of the enlargement assumption region Q1 is equal to or smaller than the reference value for height (NO in step S350), the processor 210 performs the processing in step S370, without changing the rectangular region S1.

In the example of FIGS. 5A to 5D, for example, the height (and the width) of the enlargement assumption region Q1 is equal to or smaller than the height (and the width) of the display region 111 of the display device 110. Therefore, in the example of FIGS. 5A to 5D, the pieces of processing in step S340 and step S360 are not performed.

FIG. 9 is a view showing an example that the height of the rectangular region is changed in step S360. The difference between the example of FIG. 9 and the example of FIGS. 5A to 5D is a magnification for enlarging the rectangular region S1. Hereinafter, processing of changing the height of the rectangular region in step S360 will be described in detail with reference to FIG. 9.

In the example shown in FIG. 9, a height H0 of the display region 111 of the display device 110 that is set as the reference value for height is 1200 pixels. On the other hand, a height h1 of the rectangular region S1 that is calculated by the coordinates of the input two points is assumed to be 500 pixels. When the confirmation magnification is three times, a height H1 of an enlargement assumption region Q1' of the rectangular region S1 becomes 500×3=1500 (pixels). Accordingly, the processor 210 decides that the height H1 of the enlargement assumption region Q1' is larger than the height H0 of the display region 111 of the display device 110 (YES in step S350). Therefore, the processor 210 performs processing of reducing the height h1 of the rectangular region S1 (step S360).

Specifically, the processor 210 calculates a height h2, by dividing the height H0 (1200 pixels) of the display region 111 of the display device 110 by the confirmation magnification 3. The processor 210 recalculates the rectangular region S2, to have the height h2. The recalculated height h2 of the rectangular region S2 becomes 1200/3=400 (pixels). Accordingly, the recalculated height of an enlargement assumption region Q2 of the rectangular region S2 becomes 1200 pixels that is the same as the height H0 of the display region 111 of the display device 110, and becomes a height that can be displayed inside the display region 111 of the display device 110. Note that, the recalculated height of the enlargement assumption region Q2 of the rectangular region S2 may not be actually calculated.

Referring back to FIG. 8, in step S370, the processor 210 arranges the rectangular region so that a center of the rectangular region coincides with a midpoint of the coordinates of the designated two points. In FIGS. 5C and 9, in order to facilitate understanding, the rectangular region is shown by making the centers of the rectangular region S1 and the enlargement assumption region Q1 coincide with the midpoint of the coordinates of the designated two points P1 and P2. However, in each processing before step S370, it is not necessary to make the center of the rectangular region S1 or the enlargement assumption region Q1 coincide with the midpoint of the coordinates of the designated two points P1 and P2.

Finally, the processor 210 specifies the arranged rectangular region as a specified region (step S380), and ends the calculation processing of a specific region. After ending the calculation processing of a specific region, the processor 210 performs the enlargement processing of a specific region (step S130) in FIG. 4.

When the processing in step S340 or step S360 is performed, in the later superimposition display processing of an enlarged image (step S140), there is a case where an edge of the enlarged image coincides with an edge of the display region 111 of the display device 110. If the edge of the enlarged image coincides with the edge of the display region 111 of the display device 110, there is a risk that the operation to the first image is limited. For example, when a condition for starting a predetermined program is linked to an operation that is performed to an end of the first image, the operation to the first image is limited. Therefore, in the processing shown in FIG. 8, the calculation processing of the specific region may be performed, by setting a reference value for width and/or a reference value for height to a value smaller than the width and/or the height of the display region 111 of the display device 110. By the above operation, it becomes possible to avoid the coincidence of the edge of the enlarged image with the edge of the display region 111 of the display device 110.

1-2-1-3. Enlargement Processing of Specific Region

The enlargement processing of a specific region (step S130) will be described. In the enlargement processing of a specific region, the processor 210 enlarges a specific region specified by the calculation processing of a specific region, at a predetermined magnification (hereafter, referred to as "display magnification"). The display magnification is larger than one times. The processor 210 generates image information showing an enlarged image that is obtained by enlarging the specific region at the display magnification. The generated image information is stored in the storage device 220.

The display magnification that is used in the enlargement processing of a specific region in step S130 is set identical with or smaller than the confirmation magnification that is used in step S120, for example. When the display magnification that is used in step S130 is larger than the confirmation magnification used in step S120, there is a risk that the enlarged image cannot be within the display region ill of the display device 110. By the above setting, such a situation can be avoided.

1-2-1-4. Superposition Display Processing of Enlarged Image

The superimposition display processing of an enlarged image (step S140) in FIG. 4 will be described. In the superimposition display processing of an enlarged image, the processor 210 causes the display device 110 to superimpose and display, on the first image, an enlarged image (the second image) of the image information generated by the enlargement processing of a specific region in step S130.

The processor 210 adjusts a position of the enlarged image so that the enlarged image is within the display region 111 of the display device 110. Specifically, assuming that on the first image, the enlarged image is arranged at a position so that the center of the specific region and the center of the enlarged image coincide with each other, the processor 210 decides whether the enlarged image is entirely within the display region 111 of the display device 110.

When whole of the enlarged image is within the display region 111 of the display device 110, at a position so that the center of the specific region and the center of the enlarged image coincide with each other, the processor 210 causes the display device 110 to display the enlarged image at the above position. For example, in the example of FIG. 5D, the enlarged image E1 does not extend outside the display region 111 of the display device 110, at a position where the center of the enlarged image E1 and the center of the rectangular region S1 coincide with each other. Therefore, the display device 110 superimposes and displays the enlarged image E1 at the above position on the first image 410.

On the other hand, when any part of the enlarged image extends outside of the display region 111 of the display device 110 with the enlarged image arranged at a position so that the center of the specific region and the center of the enlarged image coincide with each other, the processor 210 shifts the position of the enlarged image so that whole of the enlarged image is within the region of a part of the display region 111 of the display device 110 within the display region 111 of the display device 110. For example, when a part of the enlarged image extends outside the display region 111 of the display device 110 to the left side, the processor 210 moves the enlarged image to the right by an extending length of the enlarged image outside the display region 111 of the display device 110. Hereinafter, an operation will be described in detail with reference to FIGS. 10A and 10B.

As shown in FIG. 10A, at the above position, an enlarged image E2 extends outside the display region 111 of the display device 110 to the left side (i.e., in the negative x direction) by a distance D1. This is because a left corner portion of the image 410 displayed in a whole of the display region 111 of the display device 110 is enlarged. Therefore, the processor 210 shifts the enlarged image E2 along the positive x direction, by the extending distance D1 of the enlarged image outside the display region 111 of the display device 110, as shown in FIG. 10B. When any part of the enlarged image extends outside the display region 111 of the display device 110 to an upside, a right side, and a downside, the processor 210 similarly performs the processing of shifting the enlarged image to a direction opposite to the extending direction of the enlarged image outside the display region 111 of the display device 110.

By shifting the enlarged image by an extending length as in the example shown in FIGS. 10A and 10B, there is a case where the edge of the enlarged image and the edge of the display region 111 of the display device 110 coincide with each other. Further, there is a case where the edge of the enlarged image and the edge of the display region ill of the display device 110 coincide with each other, without performing the above shift processing. As described above, if the edge of the enlarged image and the edge of the display region 111 of the display device 110 coincide with each other, there is a risk that the operation to the first image is limited. Accordingly, when there is a risk that the edge of the enlarged image and the edge of the display region 111 of the display device 110 coincide with each other, the processor 210 may perform processing of shifting the edge of the enlarged image, from a position where the edge of the enlarged image and the edge of the display region 111 of the display device 110 coincide with each other, to inside the display region 111 of the display device 110 by a predetermined distance. Further, the processor 210 may perform processing of shifting the enlarged image by an extending length in a similar manner to that in FIGS. 10A and 10B, based on a region which is inside of the display region 111 by a predetermined distance from the end of the display region 111 of the display device 110.

When specific processing (such as a click and execution of a program) is performed inside or around the enlarged image, the processor 210 erases the displayed enlarged image.

1-2-2. Mirroring Operation

A mirroring operation performed by the image processing device configured as described above will be described below.

When coordinates on the first image 410 are designated by a coordinate input device such as the touch panel 120, the touch pad 140, and the buttons 150, the processor 210 performs specific processing. For example, when coordinates on the icon 430 displayed in the first image 410 are designated by a double click, the processor 210 performs information processing of starting a predetermined program.

When the enlarged image obtained by the enlargement display processing is being superimposed and displayed on the first image 410 in such a manner that the enlarged image occupies a part of the first image 410, the processor 210 performs a mirroring operation of relating some operation such as a starting of the program to coordinates of the enlarged image. Specifically, when coordinates are designated to the enlarged image by the coordinate input device, the processor 210 regards that the corresponding coordinates are designated in the specific region, and performs information processing corresponding to the coordinate input on the specific region. For example, in FIG. 5D, when an icon image 440 displayed in the enlarged image E1 is double-clicked, the processor 210 regards that the icon 430 (see FIG. 5B) on the specific region as an enlargement source is double-clicked, and performs information processing corresponding to the double-click of the icon 430.

Accordingly, the user can perform an operation to the image of the enlargement source, by designating the coordinates on the enlarged image. As a result, the user can intuitively operate the information processing apparatus 100.

1-3. Effects

As described above, in the present embodiment, the information processing apparatus 100 has the display device 110 configured to display a first image, the touch panel 120 configured to input the coordinates on the first image 410, and the processor 210 configured to perform processing based on input to the touch panel 120. The processor 210 specifies a part of the region on the first image 410, as a specific region, based on coordinates of two points input to the touch panel 120. The processor 210 generates a second image obtained by enlarging the specific region at a predetermined display magnification. The processor 210 causes the display device 110 to superimpose and display a second image on the first image 410 with the second image occupying a part of the first image 410.

Accordingly, when the user input the coordinates of the two points, the information processing apparatus 100 can display an enlarged image for the user, by enlarging a region specified by the input. Therefore, the user can designate a region to be enlarged by a simple operation to cause the display device to display a part of the region of the display region 111.

In the present embodiment, the coordinate input device is the touch panel 120 arranged in the display device 110. Accordingly, the user can designate the same coordinates as the coordinates of a position touched on the display device 110, and can intuitively operate the touch panel 120.

In the present embodiment, the processor 210 detects both the coordinates of the first point P1 input by the touch to the touch panel 120 and the coordinates of the second point P2 input by the touch to the touch panel 120 during a period when the input of the coordinates of the first point P1 continues (step S220), and determines the coordinates of the two points P1 and P2 based on the coordinates of the first and second points P1 and P2.

By the above operation, following a user's natural operation of substantially simultaneously touching the display device 110 with two fingers or placing the thumb after placing the middle finger on the display device 110, the information processing apparatus 100 generates the enlarged image based on the coordinates of the two points corresponding to the two fingers. Therefore, the user can intuitively clearly designate the region that is desired to be enlarged, with one hand or two hands.

In the present embodiment, when new coordinates of a point P3 are input to the touch panel 120 (step S260) after the input of the coordinates of one of the two points P1 and P2 is released, the processor 210 replaces the released the coordinates with the new coordinates of the point P3 (step S265).

By the above operation, when the user makes an error in selecting a position to be touched on the touch panel 120 in the input of the coordinates of the first point or the second point, the user can release the wrong designation, and can correct the designated position, by touching a new point of coordinates.

In the present embodiment, the processor 210 arranges the enlarged image E1, at a position where the center of the enlarged image E1 and the center of the rectangular region S1 coincide with each other on the first image 410. If any part of the arranged enlarged image E2 extends outside a whole of the display region 111 of the display device 110, the processor 210 shifts a position of the arranged enlarged image E2 to a direction opposite to a specific direction. The specific direction is the extending direction of the enlarged image E1 outside the display region 111 of the display device 110. The processor 210 causes the display device 110 to display the enlarged images E1 and E2, at the above positions on the first image 410 (step S140).

By the above operation, it is possible to reduce a risk that the enlarged image is displayed in the display device 110 in a state that a part of the enlarged image is cut.

In the present embodiment, the processor 210 calculates the rectangular region S1 as the designated region defined by the coordinates of the two points P1 and P2, on the first image 410 (step S310), and specifies the specific region within a range of the rectangular region S1. The processor 210 specifies a whole or a part of the center of the rectangular region S1 as the specific region so that the center of the rectangular region S1 and the center of the specific region coincide with each other (step S370). Accordingly, the user can clearly designate a region that becomes an enlargement target, by inputting the coordinates of points that sandwich the image which is desired to be enlarged. In place of the rectangular region as the designated region, the processor may calculate a circular region, an elliptical region, a square-shaped region having round angles, and the like, using a straight line formed by connecting between coordinates of two points as a diameter.

In the present embodiment, when an enlarged size of the rectangular region S1 obtained by magnifying a size of the rectangular region S1 at the confirmation magnification is equal to or smaller than a whole of the display region 111 of the display device 110, the processor 210 specifies the rectangular region S1 as the specific region. On the other hand, when a size of the rectangular region S1 enlarged at the confirmation magnification is larger than a whole of the display region 111 of the display device 110, the processor 210 specifies, inside the rectangular region S1, a region having such a size that the size enlarged at the confirmation magnification becomes equal to or smaller than a total size of the display region 111 of the display device 110, as the specific region (steps S330 to S360).

By the above operation, because the region that is enlarged in the enlarged image is within the range of the region defined by coordinates of the two points designated by the user, the user can easily forecast a display screen to be changed, as a result of the enlargement display processing. Further, because the region defined by the coordinates of the two points P1 and P2 is the rectangular region S1 that uses a straight line connecting the coordinates of the two points P1 and P2 with each other, as a diagonal line, the user can easily visually measure a result of the enlargement display processing from the input of coordinates, and can intuitively operate.

(Second Embodiment)

In the first embodiment, a specific region that becomes an enlargement display target has been specified, within a range of a rectangular region defined by the coordinates of two points designated by the user. However, instead of changing the specific region, a display magnification for the enlargement display may be changed. In a second embodiment, instead of specifying the specific region within a range of the rectangular region, a display magnification is set so that an enlarged size of the specific region becomes equal to or smaller than the size of the display region 111 of the display device 110. Hereinafter, processing will be described with reference to the drawings.

In enlargement display processing according to the second embodiment, processing similar to the enlargement display processing shown in FIG. 4 of the first embodiment is performed. However, in the calculation processing of a specific region (step S120), processing different from the processing of the first embodiment is performed, to specify a display magnification. Hereinafter, processing will be described with reference to FIG. 11.

Figure 11:
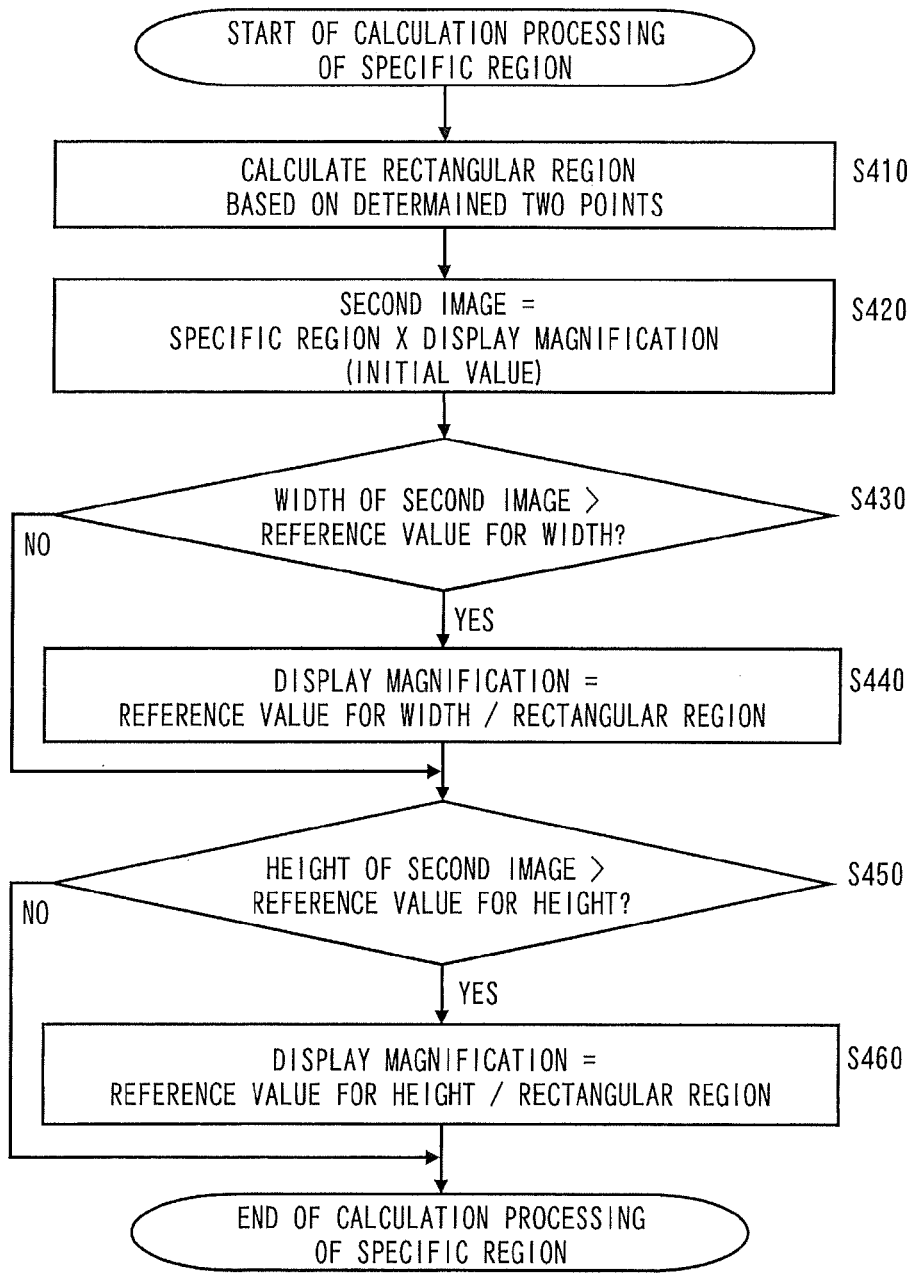
FIG. 11 shows a flowchart for describing calculation processing of a specific region according to a second embodiment.

FIG. 11 shows a flowchart for describing the calculation processing of a specific region according to the second embodiment. First, the processor 210 calculates a rectangular region that uses a straight line connecting the coordinates of two points with each other, which is determined in step S110, as a diagonal line, and specifies the rectangular region as the specific region (step S410). In the processing of step S410, the processor 210 may also specify a position of the specific region, based on the coordinates of the two points.

The processor 210 generates a second image obtained by enlarging the specific region, using a display magnification of a predetermined initial value (step S420). The display magnification of a predetermined initial value is larger than one times. The second image generated by the processor 210 may be an enlargement assumption region similar to that in the calculation processing of a specific region in the first embodiment.

Next, the processor 210 performs a comparison decision of comparing between a width of the second image with a reference value for width (step S430). The reference value for width is set to a value equal to or smaller than the width of the display region 111 of the display device 110. When the width of the second image is larger than the reference value for width (YES in step S430), the processor 210 calculates a display magnification by dividing the reference value for width by the width of the specific region (step S440). Accordingly, the width of the second image becomes equal to or smaller than the width of the display region 111 of the display device 110. On the other hand, when the width of the second image is equal to or smaller than the reference value for width (NO in step S430), the processor 210 performs processing in step S450, without changing the display magnification.

Next, the processor 210 performs a comparison decision of comparing between a height of the second image with a reference value for height (step S450). The reference value for height is set to a value equal to or smaller than the height of the display region 111 of the display device 110. When the height of the second image is larger than the reference value for height (YES in step S450), the processor 210 calculates a display magnification by dividing the reference value for height by the height of the specific region (step S460). Accordingly, the height of the second image becomes equal to or smaller than the height of the display region 111 of the display device 110. On the other hand, when the height of the second image is equal to or smaller than the reference value for height (NO in step S450), the processor 210 does not change the display magnification.

By the above processing, the display magnification is set so that the width of the second image becomes equal to or smaller than the width of the display region 111 of the display device 110 and that the height of the second image becomes equal to or smaller than the height of the display region 111 of the display device 110, and the calculation processing of the specific region ends. By the above operation, when the width or the height of the second image in the display magnification of the initial value is larger than the width or the height of the display region 111 of the display device 110, the second image is reduced by changing the display magnification.

As described above, in the present embodiment, the processor 210 compares the width or the height of the second image with the width or the height of the display region 111 of the display device 110. When the width or the height of the second image is larger than the width or the height of the display region 111 of the display device 110, the processor 210 causes the display device 110 to superimpose and display, on the first image, an image obtained by reducing the second image with the second image occupying a part of the first image.

By the above operation, it becomes possible to reduce a risk that the enlarged image is displayed in the display device 110 in a state that a part of the enlarged image is cut. Further, because the specific region is not changed from the rectangular region S1 that is defined by the coordinates of two points, the user can clearly designate an enlargement display target, and can operate intuitively.

(Other Embodiments)

As described above, the first and second embodiments have been described as an exemplification of the technology disclosed in the present application. However, the technology in the present disclosure can also be applied to an embodiment in which an alteration, substitution, addition, or omission or the like has been implemented as appropriate without restriction to the first or second embodiment. Furthermore, it is also possible to combine the constituent elements described in the aforementioned the first or second embodiment to constitute a new embodiment.

Accordingly, examples of other embodiments are given hereinafter.

In the first and second embodiments, the touch panel 120 has been described as an example of the coordinate input device. The coordinate input device may be a device that shows specific coordinates on the display device 110. Therefore, the coordinate input device is not limited to the touch panel 120. For example, the coordinate input device may be configured by the touch pad 140, a mouse (not shown), and the like. However, when the touch panel 120 is used as the coordinate input device, the user can input coordinates while visually confirming a range that is desired to be enlarged.

Further, in the first and second embodiments, in the coordinate determination processing of two points, the processor 210 has detected the coordinates of the second point P2 input to the touch panel 120, during a period when the input of the coordinates of the first point P1 continues after the coordinates of the first point P1 are input (step S220). The processor 210 may receive an input of the coordinates of the second point, by a drag operation that is performed after the coordinates of the first point P1 are input. The processor 210 may determine the coordinates of the input points at a start timing and an end timing of the drag operation, as the coordinates of the two points, for example. Accordingly, the user can determine a region for the enlargement display, for example, with the touch pad 140 or the mouse by inputting the coordinates of the second point after moving the curser in a drag operation following the input of the first point. Further, the processor 210 may detect the coordinates of the second point P2 input to the touch panel 120, within a predetermined period after the coordinates of the first point P1 are input. Accordingly, the user can designate a region that becomes an enlargement display target, by double-clicking the coordinates of the second point within a predetermined period after double-clicking the coordinates of the first point.

In the first and second embodiments, the enlarged image E1 has been displayed so that the center of the rectangular region S1 as the specific region and the center of the enlarged image E1 coincide with each other. However, the enlarged image E1 may be displayed in the display device 110. Therefore, a position where the enlarged image E1 is displayed is not limited to the center of the rectangular region S1. For example, the enlarged image E1 may be arranged at a position where one side of the specific region and one side of the enlarged image E1 coincide with each other. However, when the enlarged image E1 is displayed so as to occupy a part of the first image, the user can perform the operation to the enlarged image E1 without greatly moving a line of sight. Particularly, when the enlarged image E1 is superimposed and displayed on at least a part of the rectangular region S1, the user can operate to the enlarged image E1 without greatly moving the line of sight, because there is a high possibility that the region of the enlargement source is overlapped on the enlarged image E1. It is also possible to obtain a similar effect, by superimposing and displaying a part of the enlarged image E1 on a part of a straight line obtained by connecting between the coordinates of the two points determined by the processor 210 in step S110.

In the first and second embodiments, an example that includes one display device 110 has been described, as an example of the information processing apparatus 100. However, the number of the display device 110 included in the information processing apparatus 100 is not limited to one. Therefore, the information processing apparatus 100 may include two or more display devices 110. In this case, the first image may be displayed by striding over a plurality of display devices. In the calculation processing of the specific region (steps S310 to S380, and S410 to S460), the display device may be interpreted as a plurality of display devices. That is, the present disclosure may be applied to heights and widths of display regions of the plurality of display devices.

In the first and second embodiments, an example that the first image 410 is displayed in the whole of the display region 111 of the display device 110 has been described. Further, the first image 410 may be displayed in only a part of the display region 111 of the display device 110.

In the first and second embodiments, the calculation processing of the specific region (steps S310 to S380, and S410 to S460) and the superimposition display processing of the enlarged image (see FIGS. 10A and 10B) have been described using a whole (pixel units) of the display region 111 of the display device 110. However, the description is an example. Therefore, in place of a whole of the display region 111 of the display device 110 a part of the display region 111 of the display device 110 may be used. A part of the display region of the display device is not necessarily limited to a display range or a valid pixel of the display device. A part of the display region of the display device may be defined as one section on not only physical screens but also logical screens. For example, a window provided by the OS, a predetermined image, and a screen in which a display range is defined by a black frame may be used as part of the display region of the display device, as application examples of the present disclosure.

For example, the processor may display the enlarged image in a region (such as a window) of a part of the display region 111 of the display device 110. Then, when any part of the enlarged image extends outside the region of a part of the display region 111 of the display device 110 with the enlarged image arranged at the position so that the center of the specific region and the center of the enlarged image coincide with each other as described in the first embodiment, the processor 210 may shift the position of the enlarged image so that whole of the enlarged image is within the region of a part of the display region 111 of the display device 110.

As described above, each embodiment has been described as an exemplification of the technology in the present disclosure. The appended drawings and the detailed description have been provided for this purpose.

Consequently, in the constituent elements described in the appended drawings and the detailed description, there may be included not only constituent elements that are essential for solving the problem but also, in order to give an example of the aforementioned technology, constituent elements that are not essential for solving the problem. Therefore, the non-essential constituent elements should not be immediately perceived as being essential due to these non-essential constituent elements being described in the appended drawings and the detailed description.

Furthermore, since the purpose of the aforementioned embodiment is to give an example of the technology in the present disclosure, it is possible for various alterations, substitutions, additions, and omissions and the like to be implemented within the scope of the patent claims or within a scope equivalent thereto.

INDUSTRIAL APPLICABILITY

The present disclosure can be applied to an information processing apparatus that can be operated by designating coordinates on a screen. Specifically, the present disclosure can be applied to a personal computer, a smart phone, and a tablet terminal and the like.

What is claimed is:

1. An information processing apparatus comprising:
a display device configured to display a first image;
a coordinate input device configured to input coordinates on the first image; and
a processor configured to perform processing based on input to the coordinate input device, wherein
the processor
calculates a designated region on the first image that is defined by coordinates of two points that are input to the coordinate input device,
specifies a specific region within a range of the designated region,
generates a second image that is obtained by enlarging the specific region at a predetermined magnification, and
causes the display device to superimpose and display the second image on the first image with the second image occupying a part of the first image,
wherein when a size of the designated region enlarged at the predetermined magnification is equal to or smaller than a size of a part or a whole of the display region of the display device, the processor specifies the designated region as the specific region, and generates the second image that is obtained by enlarging the specific region at a first magnification, and when a size of the designated region enlarged at the predetermined magnification is larger than a size of a part or a whole of the display region of the display device, the processor specifies a region having such a size that the size enlarged at the predetermined magnification becomes equal to or smaller than a size of a part or a whole of the region of the display device, as the specific region, inside the designated region, and generates the second image that is obtained by enlarging the specific region at a second magnification, the first magnification and the second magnification being the same as the predetermined magnification.

2. The information processing apparatus according to claim 1, wherein the coordinate input device is a touch panel that is arranged in the display device, and the processor detects first coordinates of a first point, which are input by a touch to the touch panel, and second coordinates of a second point, which are input by a touch to the touch panel during a period when the input of the first coordinates continues, and determines the coordinates of the two points based on the first and second coordinates.

3. The information processing apparatus according to claim 2, wherein when new coordinates of a new point are input to the coordinate input device after one of an input of the first coordinates and an input of the second coordinates is released, the processor replaces the released coordinates with the new coordinates.

4. The information processing apparatus according to claim 1, wherein the processor compares a width or a height of the second image with a width or a height of a part or a whole of the display region of the display device, and when a width or a height of the second image is larger than a width or a height of a part or a whole of the display region of the display device, the processor causes the display device to superimpose and display an image obtained by reducing the second image on the first image with the displayed image occupying a part of the first image.

5. The information processing apparatus according to claim 1, wherein the processor arranges the second image at a predetermined position on the first image, and the processor shifts a position of the arranged second image in a specific direction when any part of the arranged second image extends outside a region of a part or a whole of the display region of the display device, the specific direction being opposite to the extending direction of the second image outside the region of a part or a whole of the display region of the display device, and the processor causes the display device to display on the first image the second image at the predetermined position or the shifted position.

6. The information processing apparatus according to claim 5, wherein the predetermined position is a position so that a center of the second image and a center of the specific region coincide with each other.

7. The information processing apparatus according to claim 1, wherein the processor detects first coordinates of a first point, which are input to the coordinate input device, receives an input of second coordinates of a second point, by a drag operation that is performed after the first coordinates are input, and determines coordinates of the two points based on the first and second coordinates.

8. The information processing apparatus according to claim 1, wherein the designated region is defined as a rectangular region that has, as a diagonal line, a straight line connecting the coordinates of the two points with each other.

\* \* \* \* \*